United States Patent Office 3,824,185
Patented July 16, 1974

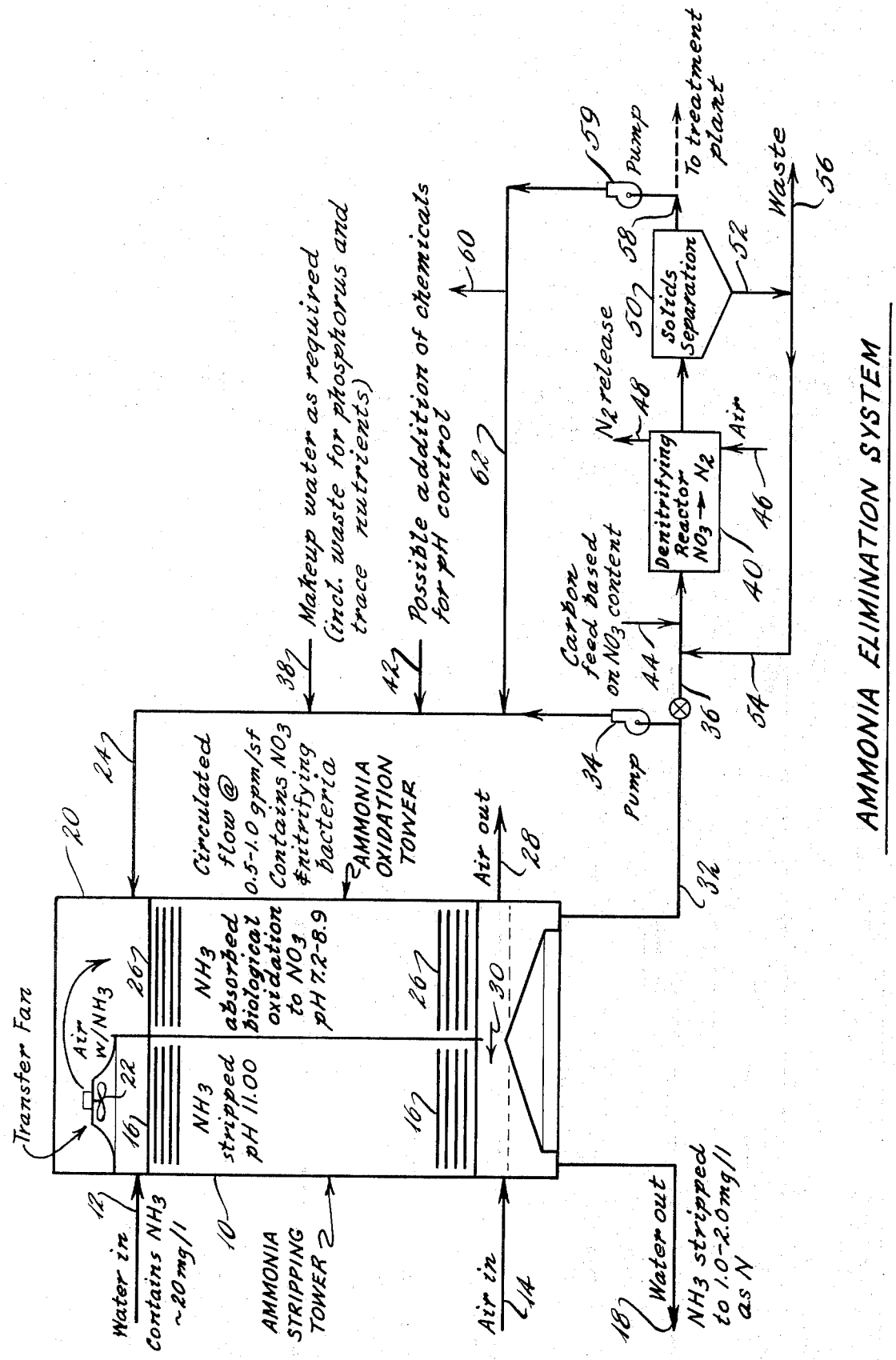

3,824,185
AMMONIA ELIMINATION SYSTEM
David H. Caldwell, Lafayette, Calif., and Edwin F. Barth, Cincinnati, Ohio, assignors to the United States of America as represented by the Administrator of the Environmental Protection Agency
Filed Sept. 5, 1972, Ser. No. 286,353
Int. Cl. C02c 1/02
U.S. Cl. 210—3     10 Claims

ABSTRACT OF THE DISCLOSURE

The nitrogen content of waste water is removed by air stripping ammonia from waste water. The ammonia is then absorbed in water containing nitrifying microorganisms, so that the ammonia is oxidized in the absorber water. The absorber and nitrifier water becomes far more concentrated in nitrogen than the original waste water and can be denitrified by denitrifying microorganisms in a small reactor. Air and water can be recycled in the system.

---

This invention relates to waste water for sewage treatment procedures and in particular relates to the removal of ammonia from waste water by a combined air stripping and biologic denitrification procedure.

The presence of excessive amounts of nitrogen and phosphorus in waste water effluents are now recognized to be a problem of national concern. Their removal may be crucial to prevention of excessive growth of algae in lakes and streams. In addition, ammonia nitrogen in waste water effluents can deplete the oxygen reserves of the receiving waters. Conventional waste water treatment procedures are not effective to remove all nitrogen or phosphorous compounds before discharge of the treated effluent. Yet to maintain water quality, the nitrogenous and phosphorus containing materials and solution must be removed somehow from treated waste water.

The present invention relates explicitly to a process for substantially diminishing the nitrogen content of waste water, particularly the ammonia nitrogen content therein. Advantageously, practice of the procedure of the present invention also will remove some of the phosphorus content from the waste water.

The desirability of removing ammonia nitrogen from a waste water stream has been recognized by the art and workable techniques considered. Thus air stripping of ammonia from waste water has been contemplated; biological denitrification of waste water has been contemplated. Unfortunately neither procedure is satisfactory in itself. Air stripping of ammonia from waste water discharges the ammonia into the atmosphere, thereby transferring the ammonia problem to the atmosphere. Theoretically, at least, the ammonia recycles back into the environment in an uncontrolled manner with potentially detrimental results. As a practical matter, air stripping is of limited applicability for several reasons. It is insufficient at below freezing temperatures, not operable at all under severe winter circumstances. For much of the United States, air stripping may be quite uneconomic, perhaps even a practical impossibility.

Biological nitrification and denitrification of the main flow waste water stream is not free from equally serious disadvantages. These transformations are biological in nature, which means that temperature extremes affect the process, winter temperatures constitute severely limiting conditions. Heating the main flow waste water stream constitutes an impractical approach. Summer or winter these biologic transformations are time dependent, requiring a large amount of tankage to insure adequate detention time. An excellent probability always exists that toxic materials will suddenly appear in the waste water stream to adversely affect these biological processes.

The procedure of the present invention combines air stripping with biological nitrification and denitrification, and in doing so avoids many of the above objections to their use for treatment of waste waters.

Briefly, the procedure of the present invention involves air stripping the main flow waste water stream. However, rather than discharge the ammonia laden air to the atmosphere, the air thereafter passes through an ammonia absorber where the ammonia content therein is absorbed into an aqueous side stream. The ammonia absorber constitutes also a biologic reactor wherein nitrifying organism, exemplary Nitrobacter species and Nitromonas species (customarily present in sewage disposal plants) present on adsorber surfaces and in the absorber water convert ammonia to nitrate and nitrite. During the winter months, at least, the air may be circulated in a closed cycle between the ammonia stripper, the main flow waste water stream step, and the ammonia absorption step. The ammonia absorber is operated with considerable water recycle to concentrate the nitrogen therein, so that only a small quantity of water heavily concentrated in nitrates, and/or alternatively, nitrites are removed therefrom for passage to a separate biologic denitrification step. In consequence, the process of the present invention serves to transfer the dilute ammonia nitrogen originally present in the waste water into a concentrated in nitrate/nitrite absorber product stream, then convert the nitrate/nitrite to nitrogen gas which, of course, can be safely discharged to the atmosphere.

As a whole, the process of the present invention fits well into conventional sewage disposal treatment cycles and even into some variations therein proposed for reducing the phosphorus content in the effluent. Specifically lime dosage and alum dosage of the effluent have been suggested to precipitate phosphorous from incoming waste water (see for example, Pat. 3,423,309). Certainly air stripping of ammonia can be combined with such a procedure since air stripping of ammonia involves adjusting pH of the waste water (by lime addition) to within the range of about 10–12.5, preferably pH 10.8–11.5. The alkaline pH converts ammonium ions to ammonia gas in solution, permitting air stripping of the ammonia. In terms of specific equipment and process variables, the air stripping of ammonia procedure already known to the art is applicable for practice of this invention. Thus the conventional gas-liquid contact towers may be employed including, for example, cooling towers wherein the liquid is constantly subdivided to form droplets which then coalesce and are resubdivided, all in the presence of a moving stream of air. To repeat, the actual stripper structure and operation forms no part of the invention. Suffice it to state that many modes of efficient water contact towers known to the art can be obtained routinely or constructed to order readily.

So far as is known, however, the ammonia absorption aspect of the present procedure is not known to the waste water treatment arts. However, other arts such as for example, refrigeration cycles, have taught that neutral or acidified water can absorb considerable ammonia. Thus a standard gas-liquid contact tower can be employed for absorbing the ammonia. The ammonia content in the air off the stripping tower will be absorbed into the absorber water of the absorber-nitrifying tower readily because of this high level of solubility of ammonia in water. However, the concentration of ammonia as such in the water of the absorber-nitrifying tower will be quite low because the active nitrifying microorganism population therein will rapidly transform the dissolved ammonia to an oxidized form, nitrite and/or nitrate. The oxygen required for the nitrifying transformation will largely be provided directly from the ammonia stripping air now being cleared of ammonia.

An important aspect of the present invention is that the absorbing and nitrifying is conducted so as to concentrate the nitrogen in the absorber-nitrifier water. Since the biological nitrification occurring in the absorber water prevents the ammonia concentration in the water from becoming high enough to interfere with absorption of ammonia therein the only real limit to the nitrogen concentrating ability of the ammonia absorber and nitrifying tower constitutes whatever concentration of nitrite, nitrate or both that is inhibitory to the nitrifying microorganisms. Relatively high nitrogen concentrations can be obtained, e.g. 2,000 mg./l. or higher. Advantageously, the microorganism cultures developed in the absorber will be nitrifying organisms in high proportions since carbon levels will be low. Such high levels of nitrifying organisms will favor the conversion of the ammonia to nitrate despite the high nitrate concentration.

In addition, no concern exists over the appearance of toxic materials in the absorber waters (which concern exists when main stream waste water must be nitrified). To repeat then, the water take-off from the absorber-nitrifier is relatively concentrated in nitrogen and, in consequence, the biologic denitrification step is effected on a concentrated in nitrogen solution. The large tankage requirement for direct biologic nitrification and denitrification of main flow waste water streams does not exist for the denitrification of the present process. The shrinkage can be dramatic. Normal domestic waste water contains about 20 mg./l. of nitrogenous materials. In the nitrified water taken off the absorber, a nitrate/nitrite nitrogen concentration in excess of about 2,000 mg./l. can be obtained, a concentration factor of 100 fold over mainstream nitrogen content. The tankage volume needed for biologic denitrification is reduced correspondingly by a factor of 100 or better. This concentration of nitrate nitrogen coupled with the fact that relatively higher carbon levels can be tolerated in this effluent, because it is a side stream process, allows the rate of denitrification to exceed conventionally attained levels and allows a reduction in denitrification reactor size by several fold. Since liquid flows in the denitrification reactor are reduced, smaller clarifier and pumps will be required. Actual clarifier size will depend on the ability to separate, thicken, and return the microbial culture back to the reactor.

For denitrification of the concentrated in nitrogen absorber water take-off, the nitrogen form nitrite or nitrate does not matter. Either form of nitrogen is amenable to biologic denitrification. Thus, to recapitulate the process, a conventional gas-liquid contact tower is operated as an ammonia absorber with biological nitrification carried out directly in the tower to remove ammonia nitrogen from the stripper air. The rate of air and water flow and the water recycle rate will, of course, be predetermined according to conventional engineering calculations for the absorber tower to provide for a high level of nitrified nitrogen in the water. The water take-off from the absorber, usually a continuous take-off, removes the net nitrogen input. The take-off water is passed to the denitrification reactor wherein conversion of the nitrate/nitrite content to nitrogen gas is accomplished by facultative denitrifying bacteria in the presence of a carbon source.

In one process mode wherein the effluent from the denitrification is discharged from the system as relatively pure water, a high quality source of organic carbon is employed, e.g. methanol. An alternative mode of operation, one actually preferred for practice of this invention, is recycle of a portion of the denitrified effluent back to the head works of the wast water treatment plant. This permits bleeding of a concentrated carbon source such as raw sludge from the primary clarifier into the denitrification reactor to provide carbon (in the form of waste water organic compounds) and trace element nutrients. The autotrophic nitrifiers and the denitrifiers both need carbon nutrient and trace elements, and this need can be met by use of cheap, readily available carbon source, such as raw sludge.

By combining and interrelating an air-ammonia stripping stage, an ammonia absorbing and nitrification stage and a denitrification stage according to practice of the present invention, certain highly advantageous processing features can be included in the system. Some of these features have already been pointed out, including notably that the air may be recycled in a closed stripping-absorbing sequence, which allows the process to operate effectively under the severest winter time conditions, so long as the waste water itself has not frozen. The denitrified water can be recycled back to the absorber creating an essentially closed nitrifier-denitrifier cycle. The gas and liquid recycle features of the process enhance heat retention in the system. With appropriate insulation, heat can also be economically added to the system since the recycle features minimize heat wastage. This allows some or all of the ammonia stripping, ammonia oxidation, and denitrification operations to be increased in efficiency if desired under cold weather conditions.

An important feature is the almost inherent separation of the reactions. Each reaction i.e. ammonia stripping, ammonia absorption, and nitrification and denitrification, can be effected at close to optimum pH and temperature conditions. Comment has already been made that the ammonia stripping should be carried out at from about pH 10–12.5. A different optimum pH range for nitrification exists, being generally in the range of pH 7.2–8.9. For denitrification, the optimum pH is the range of pH 6.5–8.0. Within the contemplation of the present invention is pH adjustment of each of the reaction stages to a reasonably optimum pH level, by addition thereto of an appropriate reagent e.g. lime. Under those modes of operation, when recycle of denitrification reactor effluent to the absorber is undertaken, the need for chemical addition to either the ammonia absorber or the dentrifying reactor for pH control will be minimized. This is because the alkalinity consumed in nitrification will be compensated by the alkalinity produced in the dentrifying reactor. In other words, the system will tend to buffer itself internally.

For further understanding of the present invention, reference is now made to the attached drawing wherein is shown for exemplary purposes a flow sheet representation of the process of the present invention.

Referring now to the drawing, it may be seen that waste water or other ammonia nitrogen containing effluents which may, for example, be an already clarified and flocculated stream of raw sewage whose pH has been adjusted to pH 11 for ammonia stripping, enters a conventional gas-liquid contact tower 10 by way of inlet line 12. Typically such a sewage contains about 20 mg./l. of ammonia. Tower 10 operates as an ammonia stripping tower. A stream of air entering tower 10 from inlet 14 passes in direct counter-current stripping contact with the waste water, removing the ammonia content therefrom. For better gas-liquid contact, tower 10 may be packed e.g. provided with redwood slat baffles 16. The stripped water leaving tower 10 by way of outlet line 18 is largely stripped of ammonia nitrogen and will, for example, contain as little as 1.0–2.0 mg./l.

The ammonia laden air is passed from stripper tower 10 to an absorber tower 20 by transfer fan 22. Tower 20 may be a duplicate of tower 10. However, stripper tower 10 operates with counter-current gas-liquid contact and operation with concurrent flow-gas liquid contact is preferred for the absorber tower 20. Thus the ammonia laden air flows through packing 26 concurrent to a stream of recycling water entering from line 24 at the top of tower 20, liquid leaving at the bottom through outlet line 32 and returned by pump 34. The air is discharged from the bottom of tower 20 either through outlet 28 to the atmosphere or is recycled through bypass 30 back into stripper tower 10.

In cold climates during the winter, air recycle may be particularly important for continued stripper and absorber operation. The possibility for air recycle reduces the net air requirement to whatever minimum is necessary to provide oxygen for the biological nitrification reactions taking place in absorber tower 20. The relatively small net air requirements are low enough to permit contemplation of heating incoming air to prevent freezing in the stripper, something virtually unthinkable in the instance of a once through air-ammonia stripping system. Air recycle may be advisable under other circumstances too. The waters in some parts of the country have a mineral matter makeup such that carbonate precipitation inside stripping tower 10 becomes a problem. In such regions a high air recycle rate may be advisable because the carbon dioxide content of recycled air is lower than that of atmospheric air, despite the generation of carbon dioxide by the nitrifying microorganisms inside the absorber tower 20.

The water stream passing out the bottom of tower 20 through line 32 is largely recycled back to tower 20 by pump 34, with only a small net take-off of nitrified water through line 36. Makeup water and nutrients are added to the recycled water from line 38. To adjust the pH in absorber tower 20 to optimum pH conditions, i.e. to pH 7.2–8.9, any necessary lime is added to the recycled water from line 42. The pH of the water recycle is set to favor absorption of the ammonia from the cycle air stream into the water and be reasonably optimum for biologic oxidation of the absorbed ammonia. The nitrifying bacteria are present in suspension in the recycling water stream passing through tower 20 and also as colonies on the packing surfaces inside tower 20. Since it is desired to operate tower 20 as a nitrogen concentrator, the recycled water may contain in excess of 2,000 mg./l. of nitrogen, as nitrate/nitrite and a very high recycle to take-off ratio is maintained.

In terms of an exemplary tower operation, the following pilot plant values are provided:

Stripping tower liquid loading ____g.p.m./sq. ft__ 2.5
Absorption tower liquid loading ___g.p.m/sq. ft__ 1.0
Air flow rate _____c.f.m__ 9,000
Cross-sectional area of small towers _sq. ft. each__ 9
Height of packing (redwood lathe) _____ft__ 12
Packing surface _____sq./ft.³__ 25
Ammonia concentration in waste water __mg./l__ 20
Ammonia removable efficiency _____percent__ 60+
Waste water flow _____g.p.d__ 10,000–20,000
Absorber tower recycled water flow _g.p.d_ 4,000–10,000

In the above pilot plant circumstances, only about 0.5–1.5 kilograms of active microorganism solids are required inside absorber tower 10 to oxidize the ½–2 kg. of ammonia nitrogen introduced per day therein, with only about a 1 millimeter thick layer of microorganism solids present on the packing surfaces of the absorber tower. From 1–3% of the recycling flow from tower 20 is removed to the denitrification stage e.g. 100 gallons per day.

The concentrated in oxidized nitrogen stream taken off in line 36 can pass to denitrifying reactor 40, together with a carbon nutrient added at inlet 44 and recycled microorganism floc added from line 54, or be discarded without further treatment or be collected for its oxidized nitrogen content. The carbon nutrient feed for the microorganism colonies in the denitrifying reactor can, of course, be a pure nutrient such as methanol. Preferred is the use of waste water (e.g. sewage on raw sludge) in appropriate quantities. In the instance of the pilot plant values given above, not more than about 2 kilograms of nutrient carbon per day is required.

Denitrifying reactor 40 is a gently stirred, elongated tank of sufficient volume and sludge content that the nitrogen loading based on nitrogen feed expressed as ratio to the mixed liquid volatile suspended solids in the reactor will be in the range of 0.05–5.0 lbs. N/lb. MLVSS-day. Gentle stirring maintains the floc in suspension. After the residence period, the now largely denitrified water passes into a terminal section of reactor 40 through which air is bubbled from air line 46 so as to release the nitrogen gas content of the denitrified water. The air and nitrogen gas is vented to the atmosphere through air outlet 48. The dentirified water, reduced in nitrogen content to about 5 mg./l., is passed to solids separator 50 and the microorganism floc recovered from bottom outlet 52. Part of the floc is recycled by way of line 54 to denitrification reactor 40, the remainder removed to waste outlet 56. The clarified effluent is removed by outlet line 58 and discharged by line 60, or passed to the main treatment plant by way of line 61, or recycled back to the absorber recycle stream by line 62.

Although pure cultures of nitrifying and denitrifying microorganisms may be employed for practice of the present invention elimination system, such is not required. Such organisms are ubiquitous, being naturally present in sewage waste waters. Accordingly, appropriate microorganism colonies will build up by themselves if some sewage waste water stream were initially introduced into the system via make-up line 38.

The already alluded to advantages of the present process can best be seen in the flow sheet of the attached drawing. Specifically, towers 10 and 20 can be combined into one piece of equipment as diagrammatically illustrated in the drawing and the whole thermally insulated so that the ammonia stripping and absorption reactions are less affected by outside temperatures, particularly by sub-freezing winter temperatures. The ability to recycle desorbed air from tower 20 back through tower 10 permits winter time operation at the lowest temperature levels since only the heat lost to the system through the tower insulation and the heat necessary to warm the make-up air is required.

In addition, the exemplary values provided above demonstrate that only the ammonia stripping which takes place in column 10 treats the entire main flow waste water stream. The recycled stream in absorber tower 20 employs a smaller quantity of water, perhaps 1% of the main flow volume. The actual take-off output from absorber tower 20 to the denitrifying reactor 40 is a concentrated nitrogen stream less than about 1% of mainstream volumes. Microorganism cultures will develop in the absorber tower 20 which will be employed for nitrification and denitrifying microorganisms will develop in the denitrifying reactor 40. As a practical matter, nitrifying and denitrifying organisms are compatible, one with the other, so that nitrifying organisms which enter denitrifying reactor 40 along with the aqueous feed thereto do not upset the denitrification reaction, nor does the small amount of denitrifying organism entering the nitrifying absorber (along with recycled water from line 60) affect the nitrification reactions which occur in the absorber 20.

The small scale of the denitrification stage permits inclusion of heating means for the denitrifying reactor if such is necessary in severe winter conditions. The essentially closed cycle aspects of water flow through the absorber-nitrifier stage and the denitrification stage (i.e. isolated from the main flow waste water stream treatment procedure) prevents transfer of toxic heavy metal ions such as lead cadmium, mercury, zinc, which may suddenly appear in the waste water from carrying over to the absorber-nitrifier and denitrification cycle.

What is claimed is:

1. A waste water nitrogen removal process which comprises:
    (a) stripping the ammonia content from the main stream waste water by counter-current contact with air whereby ammonia is transferred from the waste water to the air stream;

(b) passing the ammonia containing air into contact with an aqueous stream containing nitrifying microorganisms whereby the ammonia is absorbed from the air stream and nitrified in solution by the microorganisms, thereafter (c) using the nitrified absorber water as a nutrient for denitrifying bacteria whereby the oxidized nitrogen becomes converted to nitrogen gas.

2. The process of claim 1 wherein the main waste water stream undergoing ammonia stripping is stripped at a pH in the range of about pH 10.0–12.5; the ammonia is absorbed into a nitrifying stream having a pH of about pH 7.2–8.9 and the pH at which denitrification is biologically effected is in the range of about pH 6.5–8.0.

3. The process of claim 1 wherein absorption and nitrification is effected at high water recirculation rates, thereby achieving a nitrogen content in the circulating absorber and nitrifier water in excess of about 2,000 mg./l.

4. The process of claim 1 wherein the air is at least in part recycled between absorber and the ammonia stripper.

5. The process of claim 1 wherein effluent from the denitrification is recycled back to the ammonia absorption stream.

6. The process of claim 1 wherein the effluent from the denitrification is cycled back to the mainstream of waste water and make up water equivalent thereto is added directly to the aqueous absorption stream.

7. The process of claim 1 wherein at least part of the effluent from the absorber-nitrification tower is discharged directly without denitrification thereof.

8. The process of claim 1 wherein effluent from the denitrification is cycled back to the mainstream of waste water and make-up water containing organic carbon and other nutrients is added to the aqueous absorption stream.

9. The process of claim 5 wherein nutrients are added to the nitrified absorber water.

10. A waste water nitrogen removal system which comprises:

(a) a double gas-liquid contact tower wherein in the one portion thereof a main stream waste water is contacted with air whereby ammonia transfers from the waste water to the air, and wherein in the other portion thereof the ammonia laden air is contacted by an aqueous containing nitrifying microorganisms therein whereby ammonia is absorbed from the air and nitrified in solution in said aqueous stream, said double tower including therewith means for recycling the air between the two portions of said double tower;

(b) a denitrifying reactor containing denitrifying microorganisms therein and wherein dissolved nitrogen in nitrate and nitrite form is converted to nitrogen gas; and (c) means for passing nitrified water from said double tower to said denitrifying reactor.

References Cited

UNITED STATES PATENTS 3,617,540  11/1971  Bishop et al. _____ 210—18
3,709,364  1/1973  Savage _____ 210—11

OTHER REFERENCES

Culp et al., *Advance Wastewater Treatment*, 1971, p. 51–68.

FRANK A. SPEAR, JR., Primary Examiner

P. A. HRUSKOCI, Assistant Examiner

U.S. Cl. X.R.
210—11, 18, 195